(12) United States Patent
Suzuki

(10) Patent No.: US 6,219,900 B1
(45) Date of Patent: Apr. 24, 2001

(54) METHOD OF ASSEMBLING A STATOR CORE

(75) Inventor: Tetsuo Suzuki, Saitama-ken (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/078,683

(22) Filed: May 14, 1998

Related U.S. Application Data

(62) Division of application No. 08/803,228, filed on Feb. 20, 1997, now Pat. No. 5,786,651.

(30) Foreign Application Priority Data

Feb. 22, 1996 (JP) .......................................................... 8-35170
Feb. 22, 1996 (JP) .......................................................... 8-35171

(51) Int. Cl.$^7$ ................................................................ H02K 15/02
(52) U.S. Cl. ................................ 29/598; 29/596; 29/732; 29/243.517; 29/738; 310/218; 100/291; 100/42
(58) Field of Search ............................. 29/732, 293.518, 29/281.5, 243.517, 464, 596, 597, 598, 444, 733, 738; 310/218; 100/291, 42, 232

(56) References Cited

U.S. PATENT DOCUMENTS

| | | | |
|---|---|---|---|
| 4,464,826 | * | 8/1984 | Bair .......................................... 29/738 |
| 4,835,839 | * | 6/1989 | Forbes et al. .............................. 29/596 |
| 4,854,034 | * | 8/1989 | Archibald et al. ........................ 29/738 |
| 4,951,377 | * | 8/1990 | Fritzsche .................................. 29/596 |
| 5,111,096 | * | 5/1992 | Horst ........................................ 29/596 |
| 5,239,217 | * | 8/1993 | Horst ........................................ 310/51 |
| 5,256,926 | | 10/1993 | Hagenlocher et al. .. |
| 5,607,525 | * | 3/1997 | Gay .......................................... 29/598 |
| 5,829,120 | * | 11/1998 | Uchida et al. ............................ 29/598 |

FOREIGN PATENT DOCUMENTS

| | | | |
|---|---|---|---|
| 2 222 030 | | 2/1990 | (GB) . |
| 2 266 413 | | 10/1993 | (GB) . |
| 54-18005 | * | 2/1979 | (JP) ......................................... 29/596 |
| 54-56103 | * | 5/1979 | (JP) ......................................... 29/596 |
| 60-184493 | * | 9/1985 | (JP) ....................................... 100/291 |
| 61-124241 | | 6/1986 | (JP) . |

* cited by examiner

Primary Examiner—Lee Young
Assistant Examiner—A. Dexter Tugbang
(74) Attorney, Agent, or Firm—Armstrong, Westerman, Hattori, McLeland & Naughton, LLP

(57) ABSTRACT

A method of assembling a stator core, the stator core having a plurality of segmented cores. Each of the segmented cores has an arcuate yoke portion, a pole portion extending diametrically inwards from the yoke portion, and a tooth portion on a diametrically inner end of the pole portion, the yoke portion having a projection and a groove on circumferential one end and the other end, respectively, thereof. The segmented cores are assembled to form a stator core by circumferentially connecting the segmented cores by fitting a projection in one of adjoining segmented cores into a groove in the other of the adjoining segmented cores, the method including the steps of: arranging the projection circumferentially insertable into the groove, disposing the plurality of segmented cores into an annular shape, and pushing a movable plate downward on a cam which pushes the plurality of segmented cores radially inwards in a manner synchronized with each other such that the projection in each of the segmented cores is fit by press fitting into each of the grooves in the adjoining segmented cores from a circumferential direction.

1 Claim, 4 Drawing Sheets

METHOD OF ASSEMBLING A STATOR CORE

This is a Divisional of application Ser. No. 08/803,228, filed Feb. 20, 1997, and now U.S. Pat. No. 5,786,651.

BACKGROUND OF THE INVENTION

1. Field of the Invention

The present invention relates to a stator core which is used in a rotary electric machine such as an electric motor or the like. It also relates to a method of assembling the stator core as well as to that apparatus for assembling the stator core which is used in carrying out the method.

2. Description of the Related Art

As can be seen in Japanese Published Unexamined Patent Application No. 124241/1986, there is conventionally known the following stator core. Namely, a segmented (or divided) core is made up of an arcuate yoke portion, a pole portion which extends diametrically inwards from the yoke portion, and a tooth portion on a diametrically inner end of the pole portion. On one circumferential end and on the other circumferential end of the yoke portion, there are formed a projection and a concave groove (hereinafter simply called a groove), respectively. A plurality of segmented cores each being formed as described above are circumferentially connected together (i.e., connected together in the circumferential direction) such that a projection of one of adjoining segmented cores is fit into a groove of the other of the adjoining segmented cores, thereby assembling a stator core.

In the above-described conventional stator core, the groove is formed into a dovetail groove and the projection which is formed into a dovetail shape is fit by pressing into the groove in an axial direction of the stator core.

Since the stator core is relatively large in its axial length, in the above-described conventional one in which the projection is fit into the groove in the axial direction, the stroke of press fitting becomes long. In order to prevent the load of press fitting from becoming excessive, the interference between the projection and the groove must be made small. As a result, the segmented cores are likely to give rise to plays or are likely to cause rattling among them.

The present invention has a first object of providing a stator core in which this kind of disadvantage has been eliminated.

Further, in the above-described conventional stator core, the work of subjecting the segmented cores to press fitting in the axial direction must be carried out in sequence one at a time. It has therefore a disadvantage in that the stator core takes much time assemble.

In view of the above-described disadvantage, the present invention has a second object of providing a method of assembling the stator core with a good working efficiency as well as of providing an apparatus for assembling a stator core which is used in carrying out this method.

SUMMARY OF THE INVENTION

In order to attain the above-described first object, the present invention is a stator core having a plurality of circumferentially segmented cores, each of the segmented cores having a projection and a groove on circumferential one end and the other end, respectively, of a yoke portion thereof. The segmented cores are assembled to form a stator core by circumferentially connecting the plurality of segmented cores by fitting a projection in one of adjoining segmented cores into a groove in the other of the adjoining segmented cores. The stator core is characterized in that: a straight portion is formed in an intermediate portion of each of the projection and the groove, the straight portion extending straight in a predetermined width in a normal direction which is normal to each end surface of the yoke portion; that a front end portion of the projection and an inner bottom portion of the groove are formed into a semicircular shape having a diameter equal to a width of the straight portion; and that a contracted portion which adjoins the straight portion and has a width smaller than the width of the straight portion, and an enlarged width portion which extends in width from the contracted portion towards each end surface of the yoke portion are formed in those portions of the projection and the groove which are respectively closer to each end surface of the yoke portion; such that, when the projection is fit by press fitting into the groove in the normal direction, the contracted portion of the groove is enlarged in width within an elastic region of groove walls on diametrically outer side and inner side, respectively, of the groove to thereby allow the straight portion of the projection to pass therethrough and, that once the straight portion of the projection has passed through the contracted portion of the groove, the straight portion and the contracted portion of the groove are brought into forced contact with the straight portion and the contracted portion of the projection, respectively.

According to the above-described arrangement, it becomes possible to fit by press fitting the projection of one of circumferentially adjoining segmented cores into the groove of the other of the adjoining segmented cores in the normal direction which is normal to the end surface of the yoke portion, i.e., in the circumferential direction. Therefore, the stroke of the press fitting becomes extremely shorter than the one in which the projection is fit by press fitting in the axial direction. As a result, even if a relatively large interference between the projection and the groove is maintained, the load of press fitting will not become excessive.

Further, due to the presence of the straight portions, the tilting of the segmented cores with the fit portion of the projection and the groove functioning as a fulcrum can be prevented. In conjunction with the fact that the interference can be sufficiently secured, the rattling of the segmented cores can surely be prevented. Therefore, a stator core of high quality can be obtained.

If the groove is formed such that the widthwise center line of the straight portion coincides with the normal line that passes through the widthwise center of the end surface of the other end of the yoke portion, the groove wall on the diametrically outer side of the groove becomes thinner than the groove wall on the diametrically inner side of the groove. As a result, the bending rigidity of the groove wall on the diametrically outer side of the groove becomes smaller than the bending rigidity of the groove wall on the diametrically inner side of the groove. Therefore, when the projection is fit by press fitting into the groove, only the groove wall on the diametrically outer side is deflected, and there will occur a step (or a stepped surface) in the diametrical direction between the adjoining segmented cores.

Therefore, it is preferable to form the groove in a manner that a widthwise center line of the straight portion is offset diametrically inwards relative to the normal line passing through the widthwise center of the end surface of the other end of the yoke portion such that the bending rigidity of the groove wall on diametrically outer side of the groove becomes equal to the bending rigidity of the groove wall on diametrically inner side thereof.

Further, if the length of the straight portion of the projection is made slightly longer than the length of the straight portion of the groove to secure an interference in the normal direction between the contracted portions of the projection and the groove, the play among the segmented cores in the circumferential direction can advantageously be removed completely.

In order to attain the above-described second object, the present invention is a method of assembling a stator core which has a plurality of segmented cores. Each of the segmented cores has an arcuate yoke portion, a pole portion extending diametrically inwards from the yoke portion, and a tooth portion on a diametrically inner end of the pole portion. The yoke portion has a projection and a groove on circumferential one end and the other end, respectively, thereof. The segmented cores are assembled to form a stator core by circumferentially connecting the segmented cores by fitting a projection in one of adjoining segmented cores into a groove in the other of the adjoining segmented cores. The method comprises the steps of: arranging the projection circumferentially insertable into the groove; disposing the plurality of segmented cores into an annular shape; and then pushing the plurality of segmented cores radially inwards in a manner synchronized with each other; such that the projection in each of the segmented cores is fit by press fitting into each of the grooves in the adjoining segmented cores in a circumferential direction.

Further, an apparatus for carrying out the above-described method comprises: a bed; a movable plate which is provided above the bed so as to be movable up and down; a plurality of jigs which hold the segmented cores and are radially disposed on the bed so as to be radially movable; and cam means which is disposed under the movable plate so as to push the plurality of jigs radially inwards simultaneously with a downward movement of the movable plate.

In this case, preferably each of the jigs has a recessed potion into which each of the segmented cores is inserted in position from an upper side, and an engaging groove with which the tooth portion of each of the segmented cores is engaged for positioning in the circumferential direction.

When the movable plate is lowered in a condition in which each of the segmented cores is set in position on each of the jigs, the plurality of jigs are pushed radially inwards in a manner synchronized with each other. The plurality of segmented cores that are held by these jigs approach each other in the circumferential direction, whereby the projection of each of the segmented cores is fit by press fitting into the groove of each of the adjoining segmented cores in the circumferential direction. In this manner, the stator core can be assembled efficiently by a single operation, resulting in a largely improved workability.

Further, if the tooth portion of each of the segmented cores if set in position by forming the engaging groove in each of the jigs as described above, the circumferential clearance between the tooth portions of the respective segmented cores can be accurately controlled. Therefore, the occurrence of cogging (i.e., an irregularly aligned surface like in a cogged joint) due to the dispersion in the clearances can be prevented.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1A:
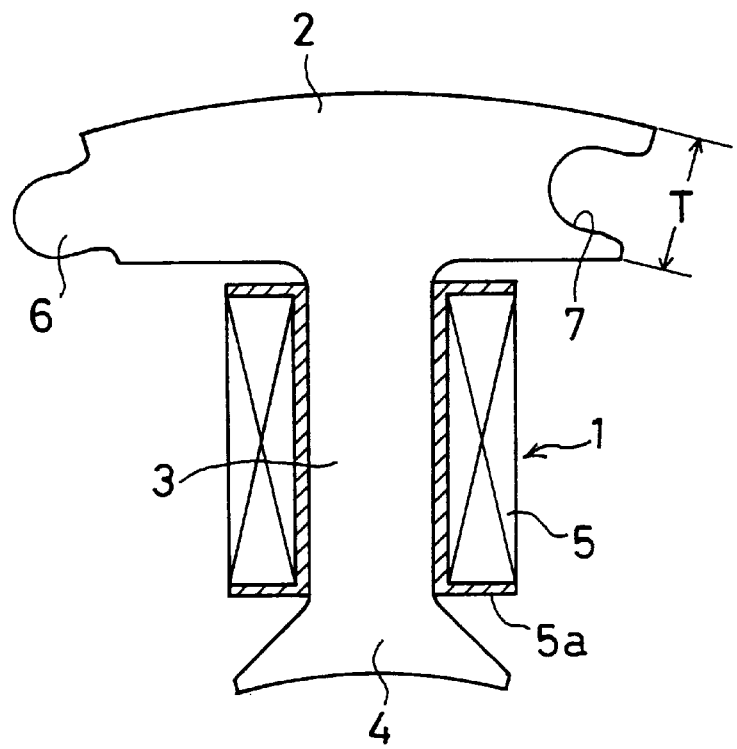
FIG. 1A is a plan view of one example of a segmented core which is a constituting unit in assembling a stator core.

With reference to FIG. 1A, numeral 1 denotes a segmented core which is a constituting unit (or element) of a stator core. The segmented core is made by laminating a number of punched pieces which are punched from a band-shaped steel plate.

The segmented core 1 is provided with an arcuate yoke portion 2, a pole portion 3 which extends diametrically inwards from a center of the yoke portion 2, and a tooth portion 4 on a diametrically inner end of the pole portion 3. A stator coil 5 is wound around the pole portion 3 via a bobbin 5a. In order to lie along an end surface of the stator coil 5, the surface on the diametrically inner side of the yoke portion 2 is formed into a flat surface which crosses at right angles to the pole portion 3.

On one circumferential end and the other circumferential end of the yoke portion 2, there are formed a projection 6 and a groove 7, respectively. It is thus so arranged that the projection 6 of each segmented core 1 can be fit by press fitting into a groove 7 of each of the adjoining segmented cores 1 in a circumferential direction.

Figure 1B:
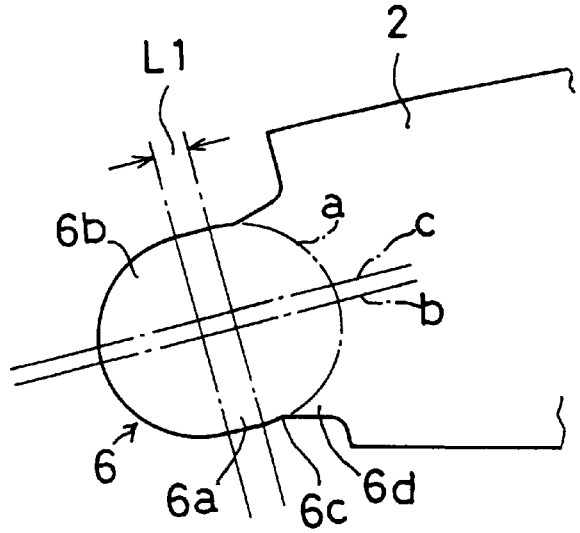
FIG. 1B is an enlarged plan view around a projection of the segmented core.
Figure 1C:
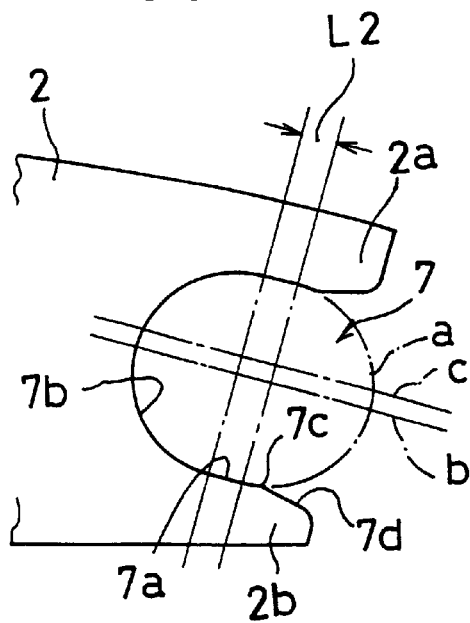
FIG. 1C is an enlarged view around a groove of the segmented core.

As clearly shown in FIGS. 1B and 1C, in each of an intermediate portion of the projection 6 and of the groove 7, there is each formed a straight portion 6a, 7a which extends straight, in a predetermined width, in a normal direction which is normal to each end surface of the yoke portion 2. Each of the front end portion 6b of the projection 6 and the inner bottom portion 7b of the groove 7 is formed into a semicircular shape whose diameter is the same as the width of the straight portion 6a, 7a.

In that portion of each of the projection 6 and the groove 7 which is closer to the end surface of the yoke 2, there are formed: a contracted portion 6c, 7c which adjoins (or lies next to) the straight portion 6a, 7a and is smaller in width than the straight portion 6a, 7a; and an expanded width portion 6d, 7d which expands in width towards each end surface of the yoke portion 2. The contracted portion 6c, 7c continues to a side edge of the straight portion 6a, 7a via an arc of a circle "a" having a diameter that is the same as the width of the straight portion 6a, 7a. The width of the contracted portion 6c, 7c is made slightly (e.g., about 0.05 mm) narrower than the width of the straight portion 6a, 7a by the difference between the diameter of the circle "a" and the length of the chord of the circle "a" that passes through the contracted portion 6a, 7a.

The enlarged width portion 6d of the projection 6 and the enlarged width portion 7d of the groove 7 are congruent with each other. However, the width and the length of the straight portion 6a of the projection 6 are made slightly larger than the width and the length of the straight portion 7a of the groove 7. For example, in case the radius of the diametrically outer surface of the yoke portion 2 is 79.5 mm, and the width T of each end surface of the yoke portion 2 is 9.5 mm, the length L1 of the straight portion 6a of the projection 6 and the width thereof are respectively set to be 1.0 mm and 6.02 mm, and the length L2 of the straight portion 7a of the groove 7 and the width thereof are respectively set to be 0.98 mm and 5.98 mm.

Further, since the surface of the diametrically inner side of the yoke portion 2 is formed into a flat surface as described above, the groove 7 which recedes from the end surface of the yoke 2 in the normal direction which is normal to the end surface gradually departs away from the surface of the diametrically inner side of the yoke portion 2 to thereby approach the surface of the diametrically outer side of the yoke portion 2. As a result, if the groove 7 is formed such that the widthwise center line b of the straight portion 7a thereof coincides with the normal line c that passes through the widthwise center of the end surface of the yoke portion 2, the bending rigidity of the groove wall 2a on the diametrically outer side of the groove 7 becomes weaker than the bending rigidity of the groove wall 2b on the diametrically inner side thereof. As a solution, in the present embodiment, the groove 7 is formed such that the above-described center line b is slightly offset diametrically inwards relative to the above-described normal line c. In this manner, the bending rigidity of the groove wall 2a on the diametrically outer side and the bending rigidity of the groove wall 2b on the diametrically inner side become equal to each other. In the case of the yoke 2 having the above-described dimensions, if the amount diametrically inward offset of the center line b relative to the normal line c is set to be about 0.75 mm, the bending rigidities of both the wall grooves 2a, 2b become equal to each other. As a matter of course, the projection 6 is also formed such that the center line b of the straight portion 6a is offset diametrically inwards relative to the normal line c that passes through the widthwise center of the end surface of the yoke portion 2.

According to the above-described arrangement, when the projection 6 of the segmented core 1 is fit by press fitting into the groove 7 of a circumferentially adjoining segmented core 1 in the above-described normal direction, the contracted portion 7c of the groove 7 is enlarged in width due to a deflection within an elastic region of the groove walls 2a, 2b on the diametrically outer and inner sides to thereby allow for the passage of the straight portion 6a of the projection 6. Once the straight portion 6a of the projection 6 has passed through the contracted portion 7c of the groove 7, the straight portion 7a and the contracted portion 7c of the groove 7 are brought into a forced (or urged) contact with the straight portion 6a and the contracted portion 6c of the projection 6, respectively. Then, due to the forcible contact of the projected portions 6a and 7a, the tilting movement of the segmented core 1 with the fit portion of the projection 6 and the groove 7 functioning as a fulcrum is prevented. Further, since the length of the straight portion 6a of the projection 6 is made slightly longer than the length of the straight portion 7a of the groove 7, the interference in the above-described normal direction between the contracted portion 6c of the projection 6 and the contracted portion 7c of the groove 7 can also be secured. As a result, the play in the circumferential direction between the segmented cores 1, 1 that adjoin in the circumferential direction can be completely removed. Still furthermore, since the bending rigidities of both the groove walls 2a, 2b on the diametrically outer and inner sides of the groove 7 are made equal to each other, both the groove walls 2a, 2b are evenly deflected, whereby the projection 6 is correctly fit into the groove 7 along the center line thereof. Thus, the segmented cores 1, 1 that adjoin each other in the circumferential direction can be accurately connected to each other into a condition in which those end surfaces of the yoke portions 2, 2 that cross the above-described normal line at right angles are brought into close contact with each other, without giving rise to rattling or a deviation (or a step) in the diametrical direction.

Figure 2:
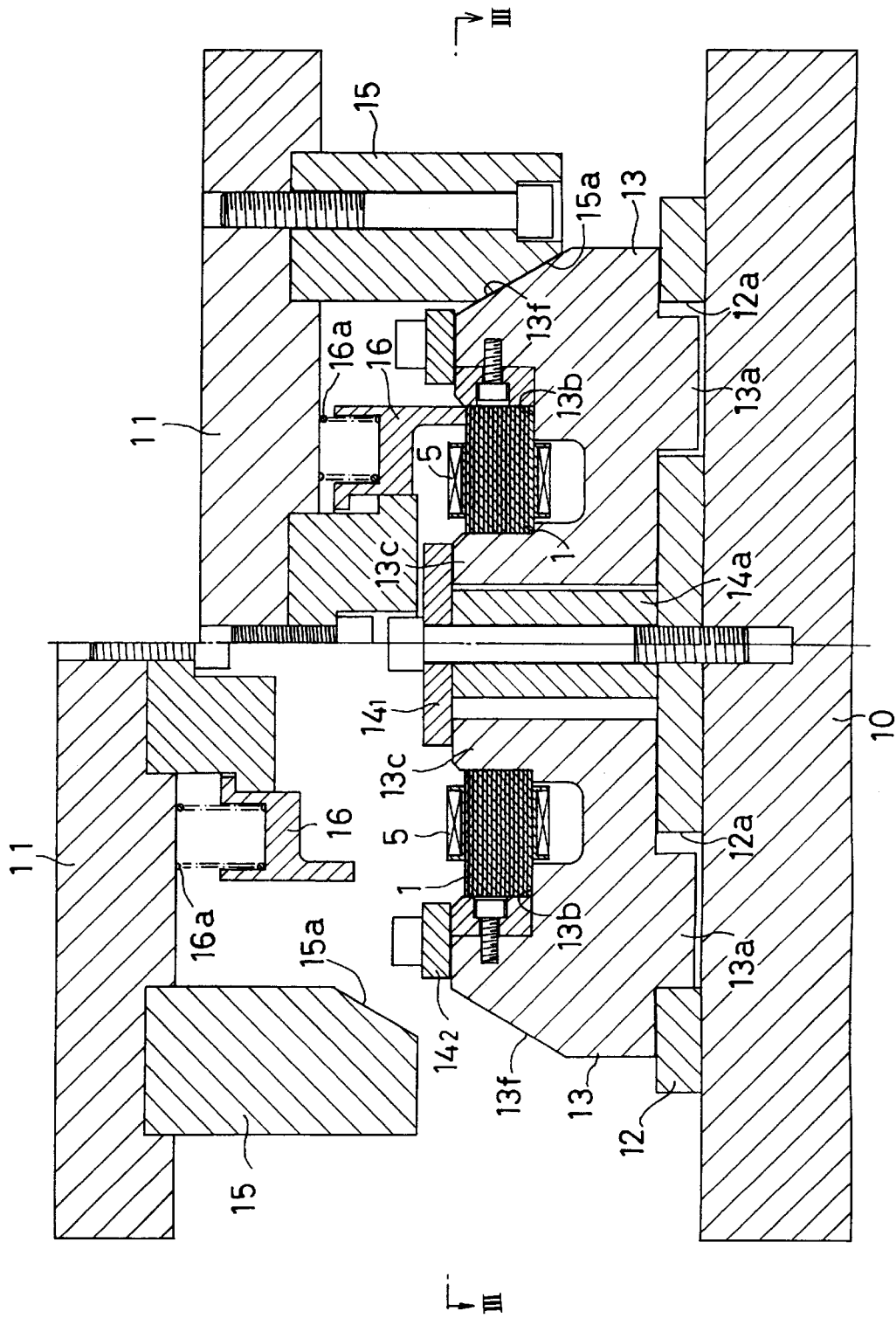
FIG. 2 is a vertical sectional view of an apparatus for assembling a stator core according to the present invention.
Figure 3:
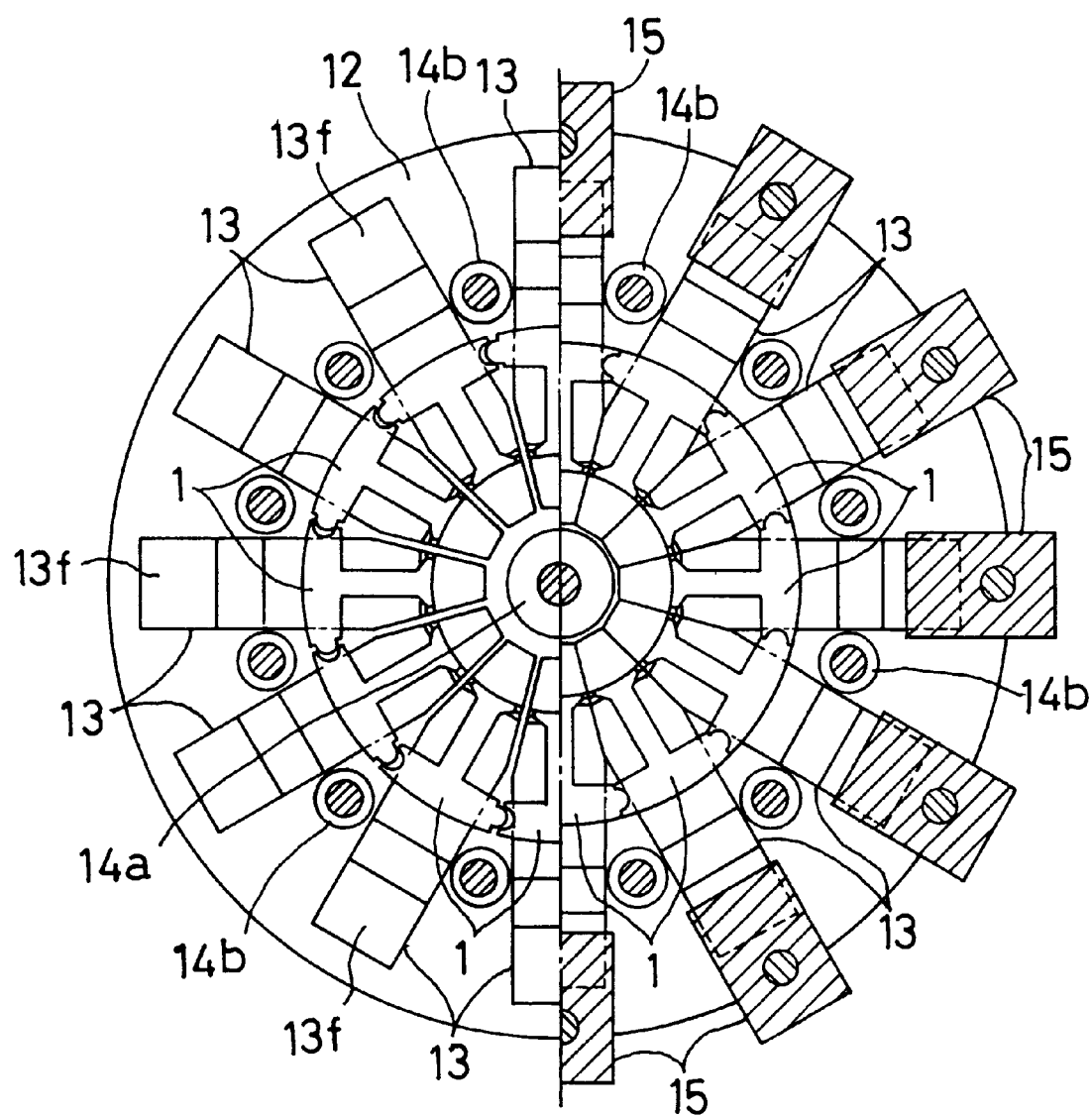
FIG. 3 is a cross-sectional view taken along the line III—III in FIG. 2.

The stator core is assembled by circumferentially connecting a plurality of the above-described segmented cores 1 into an annular shape. The assembling thereof is carried out by employing an apparatus for assembling the stator core (also called an assembly apparatus) as shown in FIGS. 2 and 3.

The assembly apparatus is constituted by an apparatus similar to a pressing apparatus. The assembly apparatus is provided with a bed 10 and a movable plate 11 which is moved up and down by a driving source for pressing purpose such as a ram or the like.

On an upper surface of the bed 10, there is mounted a supporting plate 12 which is provided with a plurality of radially disposed guide holes 12a. On the supporting plate 12 there are radially disposed a plurality of jigs 13 which can hold thereon the segmented cores 1. A guide projection 13a which is provided on a lower surface of each of the jigs 13 is engaged with each of the guide holes 12a. On the bed 10 there are mounted a central holding plate $14_1$ and an annular peripheral holding plate $14_2$, which prevent the jig 13 from being lifted, via supporting columns 14a, 14b, respectively. Each of the jigs 13 is thus supported in a manner radially slidable along each of the guide holes 12a.

Figure 4:
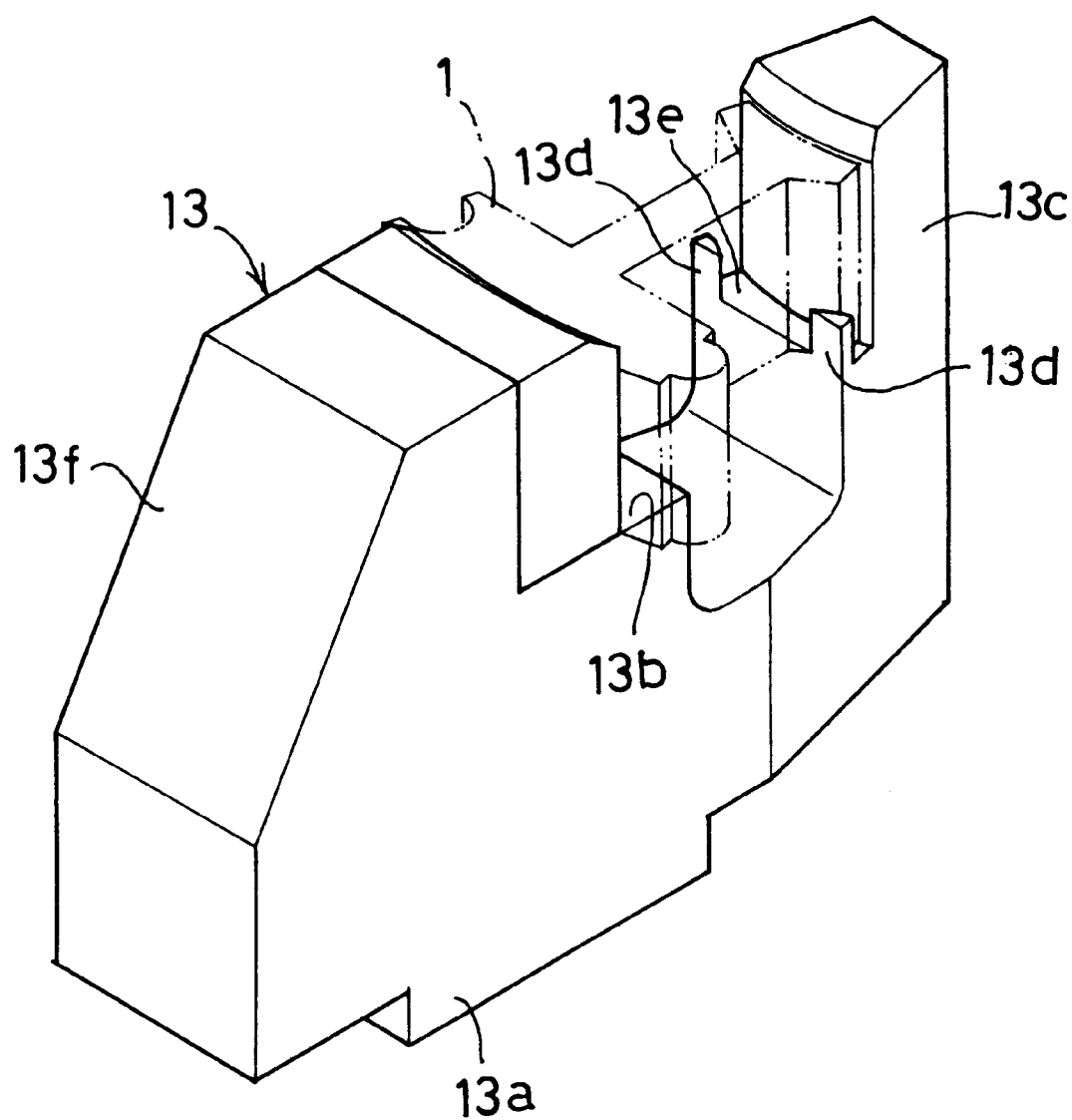
FIG. 4 is a perspective view of a jig which is provided in the apparatus for assembling the stator core.

Each of the jigs 13 is provided with a recessed portion 13b into which the segmented core 1 can be inserted for setting in position from an upper side. As shown in FIG. 4, in a radially inner portion of the recessed portion 13b, there are vertically provided a pair of smaller projections 13d, 13d in a projecting manner with a distance from an inner end rising portion 13c. This rising portion 13c and the small projections 13d, 13d constitute an engaging groove 13e into which the tooth portion 4 can be engaged by positioning in the circumferential direction.

On the lower surface of the movable plate 11, there are provided, in a downwardly projecting manner, cams 15 each having a lower end inclined cam surface 15a which can be abutted with an inclined surface 13f on a radially outer end of each of the jigs 13. Further, there is mounted, on the lower surface of the movable plate 11, an annular pad 16 which prevents the segmented cores 1 from being lifted, by abutting with the yoke portions 2 of all the segmented cores 1 from an upper side. The annular pad 16 is urged downwards by springs 16a. In this embodiment, the cams 15 are separately provided for respective jigs 13. It may, however, be so arranged that a single piece of annular cam that is common to all the jigs 13 is provided.

In assembling the stator core, each of the segmented cores 1 is set in position on each of the jigs 13 in a condition, as shown in the left half portion of FIG. 2, in which the movable plate 11 is returned to an upper position and in which all the jigs 13 are returned to a radially outward position. In this condition, as shown in the left half portion of FIG. 3, the plurality of segmented cores 1 are arranged into an annular shape in a state in which the front end portion 6b of the projection 6 of each of the segmented cores 1 is positioned into (or disposed inside) the enlarged width portion 7d of the groove 7 of each of the segmented cores 1 that adjoin in the circumferential direction.

Then, as shown in the right half portion of FIG. 2, the movable plate 11 is lowered. As a result of this operation, all of the jigs 13 are pushed by the cams 15 to thereby advance radially inwards in a manner synchronized with each other, and the plurality of segmented cores 1 that are held on the jigs 13 are brought close to each other in the circumferential direction. Then, the projection 6 of each of the segmented cores 1 is fit by press fitting into the groove 7 of each of the adjoining segmented cores 1 in the circumferential direction, i.e., in the normal direction which is normal to the end surface of the yoke portion 2. The plurality of segmented cores 1 are thus connected together in the circumferential direction as shown in the right half portion of FIG. 3.

In this condition, the straight portion 7a and the contracted portion 7c of the groove 7 are respectively brought into forced (or urged) contact with the straight portion 6a and the contracted portion 6c of the projection 6, respectively, with a sufficient interference as described above. The segmented cores 1 are thus connected together without clattering, and the flatness of the segmented cores 1 is secured by the lifting prevention of the segmented cores 1 by means of the pad 16. Further, since the tooth portion 4 of each of the segmented cores 1 is positioned in the circumferential direction by means of the engaging groove 13e of each of the jigs 13, the clearance between the tooth portions 4, 4 of the adjoining segmented cores 1, 1 is maintained to a certain uniform amount. A stator core of high quality can therefore be obtained.

It is readily apparent that the above-described stator core, as well as a method and an apparatus for assembling a stator core meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method for assembling a stator core, said stator core having a plurality of segmented cores, each of said segmented cores having an arcuate yoke portion, a pole portion extending diametrically inwards from said yoke portion, and a tooth portion on a diametrically inner end of said pole portion, said yoke portion having a projection and a groove on circumferential one end and the other end, respectively, thereof, said segmented cores being assembled to form a stator core by circumferentially connecting said segmented cores by fitting a projection in one of adjoining segmented cores into a groove in the other of said adjoining segmented cores, said method comprising the steps of:

arranging said projection circumferentially insertable into said groove, disposing said plurality of segmented cores into an annular shape; and pushing a movable plate downward on a cam which pushes said plurality of segmented cores radially inwards in a manner synchronized with each other such that said projection in each of said segmented cores is fit by press fitting into each of said grooves in the adjoining segmented cores from a circumferential direction.

* * * * *